United States Patent
Shalita et al.

(10) Patent No.: US 10,395,321 B2
(45) Date of Patent: Aug. 27, 2019

(54) DYNAMIC EXPRESSIONS FOR REPRESENTING FEATURES IN AN ONLINE SYSTEM

(71) Applicant: Facebook, Inc., Menlo Park, CA (US)

(72) Inventors: Alon Michael Shalita, Palo Alto, CA (US); Ming Hua, Mountain View, CA (US); Ryan Allen Stout, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 494 days.

(21) Appl. No.: 13/690,088

(22) Filed: Nov. 30, 2012

(65) Prior Publication Data

US 2014/0156360 A1    Jun. 5, 2014

(51) Int. Cl.
*G06Q 30/02* (2012.01)
*G06Q 50/00* (2012.01)

(52) U.S. Cl.
CPC ......... *G06Q 50/01* (2013.01); *G06Q 30/0255* (2013.01)

(58) Field of Classification Search
None
See application file for complete search history.

(56) References Cited

U.S. PATENT DOCUMENTS

| | | | | |
|---|---|---|---|---|
| 7,512,612 | B1* | 3/2009 | Akella et al. | |
| 2012/0246054 | A1* | 9/2012 | Sastri | 705/37 |
| 2012/0246621 | A1* | 9/2012 | Mukkavilli | 717/126 |
| 2012/0310956 | A1* | 12/2012 | Huhn | 707/754 |
| 2012/0311036 | A1* | 12/2012 | Huhn | 709/204 |
| 2013/0041862 | A1* | 2/2013 | Yang et al. | 706/46 |
| 2013/0232159 | A1* | 9/2013 | Daya et al. | 707/758 |
| 2013/0239008 | A1* | 9/2013 | Curtis | 715/738 |

FOREIGN PATENT DOCUMENTS

WO    WO2014068573 A1 *  5/2014

OTHER PUBLICATIONS

Zheng Lin, Lubin Wang, Shuhang Guo; "Recommendations on Social Network Sites from Link Mining Perspective" (IEEE) (Year: 2009).*

* cited by examiner

*Primary Examiner* — Sam Refai
*Assistant Examiner* — Rashida R Shorter
(74) *Attorney, Agent, or Firm* — Fenwick & West LLP (57) ABSTRACT

Online systems, for example, social networking systems evaluate expressions based on features describing relations between entities represented in the online system. These expressions are represented using an expression language. The expression language allows features to be specified as functions of attributes from user accounts. The expressions support use of variables to represent computations, for example, sub-expressions. The expressions are dynamic, since expressions can be specified and executed at call time. The same set of expressions is used many times, e.g., to compute the same function for multiple feature sets, for example, user accounts. Expressions are preferably represented using postfix representation. However some expressions, for example, expressions using variables are represented as trees. To optimize the expressions at runtime, the expressions are cached using a representation determined to be efficient for executing the expression. The cached representation of the expression is applied to multiple feature sets, for example, user accounts.

22 Claims, 8 Drawing Sheets

DYNAMIC EXPRESSIONS FOR REPRESENTING FEATURES IN AN ONLINE SYSTEM

BACKGROUND

This invention relates to executing dynamic expressions based on features describing user actions in online systems, for example, social networking systems.

Online systems often present information useful to users and allow users to interact with the online system. Online systems may use various techniques to determine information that is likely to be of interest to a user before presenting the information to the user. Users are more likely to visit the online system regularly if they are presented with information they like. Online systems often earn revenue from advertisements. Advertisers prefer to advertise in online systems that are regularly visited by their users. Therefore, user loyalty may determine revenues generated by an online system. As a result, the ability of an online system to present interesting information to users typically affects the revenue earned by the online system.

Online systems often use past user actions for making decisions regarding actions taken by the online systems. For example, past user behavior may be used by an online system to suggest information to the user that a user may find interesting. An example of an online system is a social networking system that allows users to establish connections with each other. A social networking system may use past user actions to identify news feed stories that may be of interest to a user or to identify potential friends of a user for recommending to the user. Online systems often rank these entities, for example, users, newsfeed items, content, advertisements, and the like to determine which entities should be presented to a target user. Ranking these entities often requires computations based on user attributes, for example, expressions used to represent features used for ranking entities.

Online systems often constantly evolve as new functionality is added and existing functionality modified. These changes may be made to improve the online system, for example, based on user feedback, changes in technology, or development of new functionality. As a result, the computations that need to be performed in the online system keep changing on a regular basis. Conventional systems often require system upgrades to introduce these changes in computations. Since online systems are expected to run continuously, system upgrades can be a complex process and frequent system upgrades can consume significant resources.

SUMMARY

Embodiments of the invention allow an online system to dynamically incorporate expressions based on attributes describing entities represented in the online system. For example, a social networking system may dynamically incorporate expressions representing computations based on features for ranking entities represented in the social networking system. The social networking system receives a plurality of expressions, each expression for being evaluated multiple times using a number of entities. The social networking system generates and stores a representation of each expression in an expression cache. The social networking system selects a type of representation of each expression that is estimated to be most efficient. The social networking system selects a representation from a set of representations including a postfix representation and a tree representation.

In one embodiment, in the selection of a type of expression, a postfix representation is preferred over other representations of an expression. Expressions may also use variables for representing sets of computations. An expression that uses variables may be represented using a tree representation. An expression that does not use any variables may be represented using a postfix representation.

The features and advantages described in this summary and the following detailed description are not all-inclusive. Many additional features and advantages will be apparent to one of ordinary skill in the art in view of the drawings, specification, and claims.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

System Environment

Figure 1:
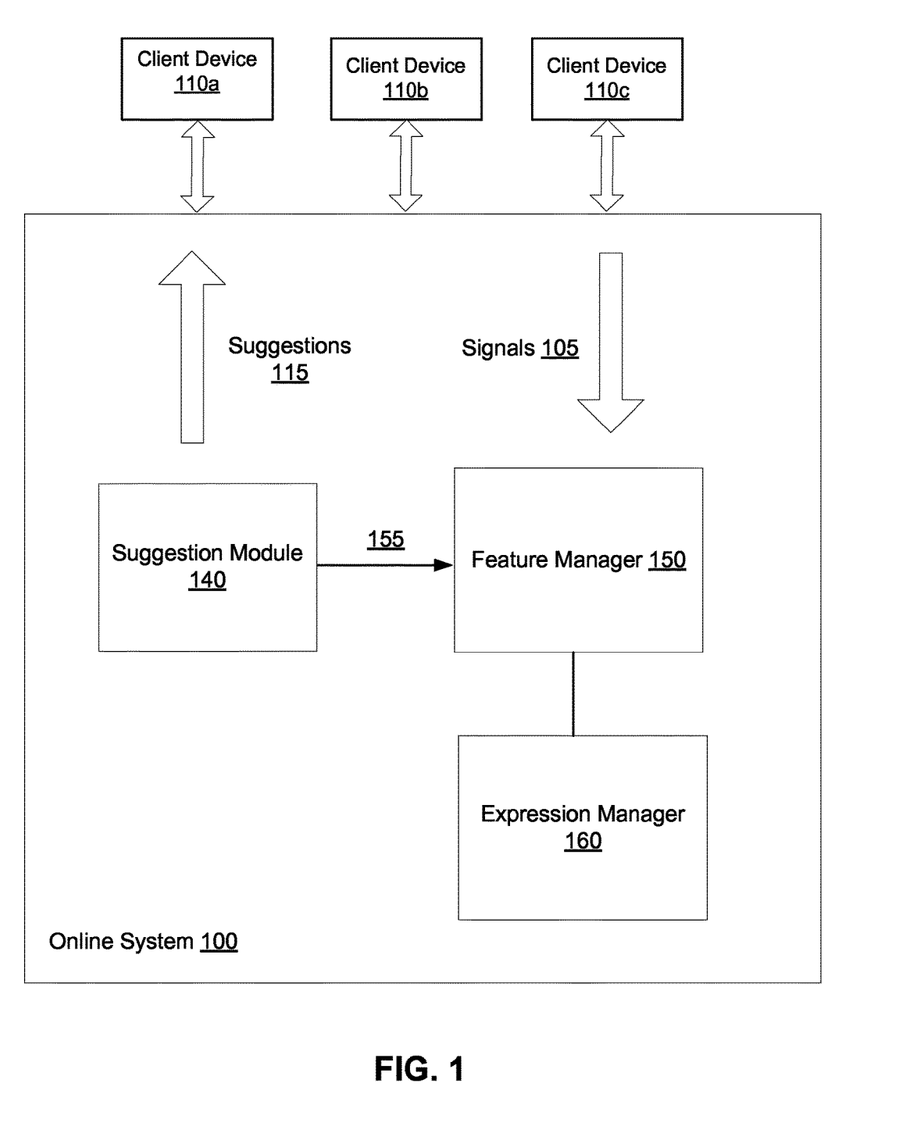
FIG. 1 is a diagram of a system environment for maintaining dynamic expressions in an online system, for example, social networking systems, in accordance with an embodiment of the invention.

FIG. 1 is a diagram of a system environment for maintaining dynamic expressions in an online system, for example, social networking systems, in accordance with an embodiment of the invention. The inventions discussed herein, although illustrated using social networking systems, are applicable to any online system that allows users to interact with the online system. Specifically, a social networking system offers its users the ability to communicate and interact with other users of the social networking system. Users join the social networking system and then add connections to a number of other users to whom they desire to be connected. As used herein, the term "friend" refers to any other user to whom a user has formed a connection, association, or relationship via the social networking system.

FIG. 1 and the other figures use like reference numerals to identify like elements. A letter after a reference numeral, such as "110a," indicates that the text refers specifically to the element having that particular reference numeral. A reference numeral in the text without a following letter, such as "110," refers to any or all of the elements in the figures bearing that reference numeral (e.g. "110" in the text refers to reference numerals "110a" and/or "110b" in the figures).

The users interact with the online system 100 using client devices 110. In one embodiment, the client device 110 can be a personal computer (PC), a desktop computer, a laptop computer, a notebook, a tablet PC executing an operating system, for example, a Microsoft Windows-compatible operating system (OS), Apple OS X, and/or a Linux distribution. In another embodiment, the client device 110 can be any device having computer functionality, such as a personal digital assistant (PDA), mobile telephone, smart phone, etc.

The online system 100 receives various signals 105 that represent user interactions with the online system 100. The information describing these signals 105 is stored in the online system as features. A feature can be a value based on information describing users of the online system or interactions of the users of the online system with the online system 100 or entities represented in the online system 100. In an embodiment, an expression language is used to specify computations based on features. These computations may be used to represent other features, for example, a feature can be represented as an expression based on attributes describing user actions. Developers of various modules of the online system 100 may specify expressions corresponding to computations based on features used by these modules. The feature manager 150 determines values of features and may store the resulting feature values in a feature store. The feature manager 150 invokes the expression manager 160 for evaluating expressions. The expression manager 160 may store different expressions used by the feature manager and execute the expressions in an efficient manner.

A computation describing closeness between two users of the online system may be specified as an expression representing a rate of interactions between the two users. A computation defining a likelihood of a user being interested in certain information can be specified as an expression based on information describing the user, for example, user interests as specified by the user or user interactions including the type of information retrieved by the user in the past. Computations defining a likelihood of a user accessing a page describing certain information, or the likelihood of a user accessing an image, video, or any other type of content available on the online system 100 may similarly be specified as expressions based on user attributes.

In one embodiment, the online system 100 stores a feature vector for pairs of objects in the system, where the feature vector contains a number of features that describe the relationship between the objects. In a social networking system, for example, a feature vector may be stored for a source user's relationship with a target user, where the feature vector contains features such as a measure of the frequency that the source user has viewed information about the target user, initiated a communication with the target user, and various other measures that describe the relationship between the source and target users. The various elements of a feature vector may be specified using expressions. Dynamic expressions may be used to represent computations based on feature vectors.

An online system 100 may use dynamic expressions for ranking entities represented in the online system. For example, a social networking system may rank different friends of a user to determine a set of close friends. Or the social networking system may rank a set of users associated with a target user to determine a set of potential friends of the target user for suggesting to the target user. The online system may also use the dynamic expressions to rank information to be presented to a user. For example, the online system may rank news feed items presented to a user, advertisements presented to the user, or content presented to a user including images, videos, or text. Determining ranks of sets of entities requires evaluating the corresponding features which in turn requires evaluating dynamic expressions.

The online system 100 may present different types of information to the users. For example a social networking system may present to a user, information describing other users, social groups, social events, content, images, and so on. There may be a large number of actions occurring in an online system 100 that are associated with the user. Since a user typically has limited time to spend on the online system 100 and also the amount of space available in a user interface of the online system 100 is typically limited, the online system 100 may select information that is most likely to be of interest to the user for presenting to the user. The online system 100 may incorporate one or more suggestion modules 140 that select information for presentation to the user from various available options.

The suggestion module 140 may use dynamic expressions to represent computations based on feature vectors to determine whether a user is likely to perform a desired action based on information presented to the user. The suggestion module 140 may make suggestions 115 to the users based on the predicted user behavior. A predictor model may be invoked by the suggestion module to make decisions regarding information presented to the user. The predictor model may represent computation using dynamic expressions for predicting user actions. As an example, the online system may include a predictor model that determines a likelihood of a user requesting more information related to a newsfeed item presented to the user. Or a predictor model may determine the likelihood of a user commenting on an image presented to the user. Alternatively, a predictor model may determine a likelihood of sending a request to connect with a user suggested as a potential connection to the user.

Figure 4A:
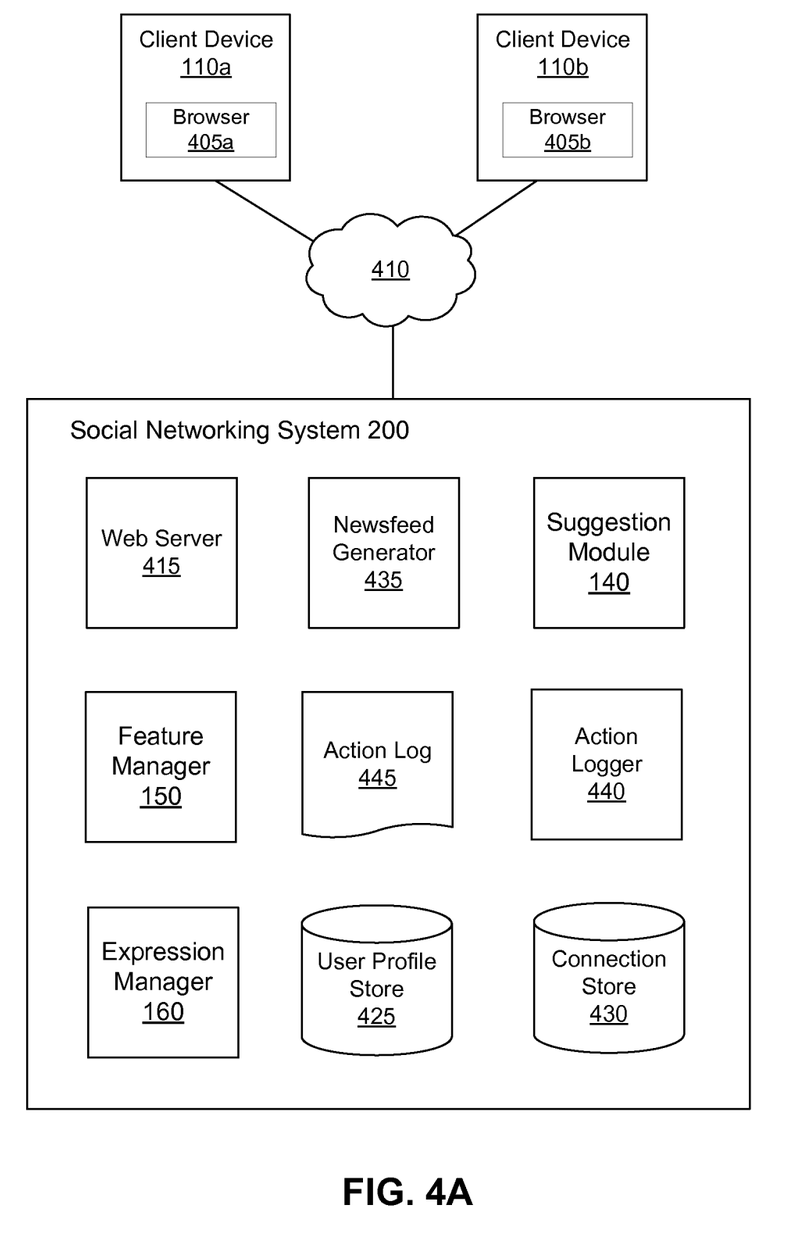
FIG. 4A illustrates a system architecture of an online system, for example, a social networking system that makes features available to other modules for processing as the corresponding user actions are available, in accordance with an embodiment of the invention.

The online system 100 comprises software modules executing on one or more computer processors. Some embodiments of the systems 100 and 110 have different and/or other modules than the ones described herein, and the functions can be distributed among the modules in a different manner than described here. The online system 100 may comprise modules other than those shown in FIG. 1, for example, modules illustrated in FIG. 4 that are further described herein.

Figure 2A:
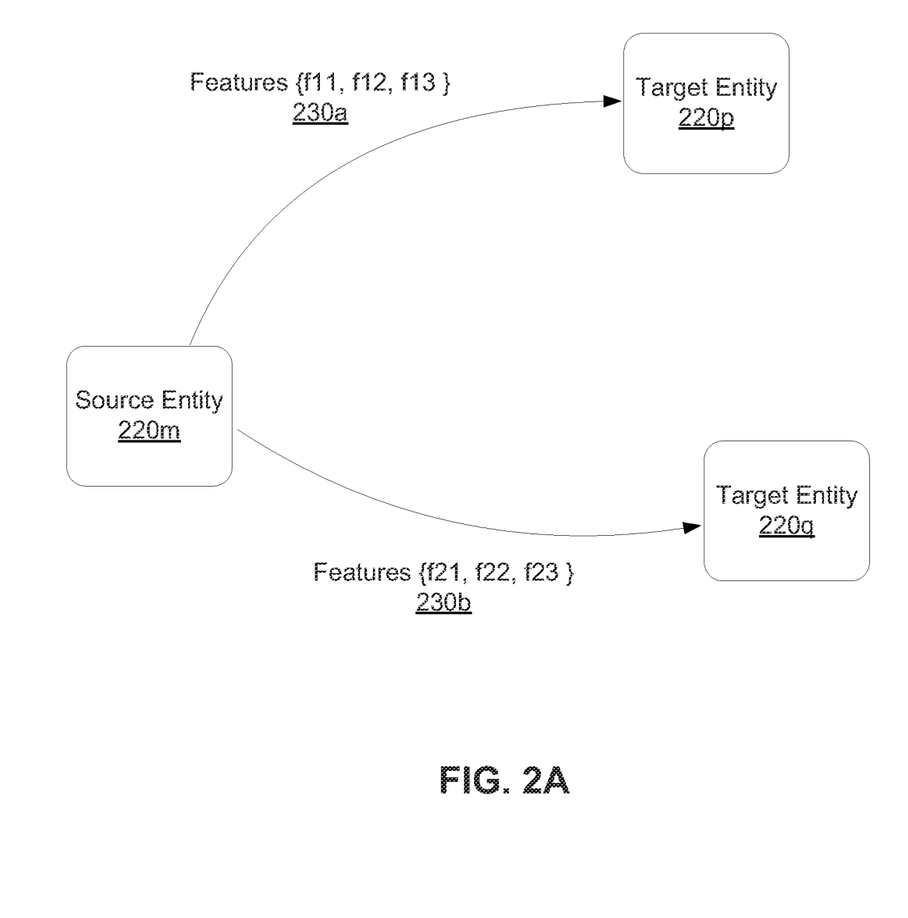
FIG. 2A is a diagram illustrating features representing interactions between two entities represented in an online system, in accordance with an embodiment of the invention.

FIG. 2A is a diagram illustrating features 230 representing interactions between entities 220 represented in an online system, in accordance with an embodiment of the invention. A feature 230 may represent interactions between a source entity and a target entity. An entity can be a user, a page represented in the online system, or an application executed within the online system. For example, features f11, f12, and f13 represent interactions between source entity 220*m* and 220*p* and feature f21, f22, and f23 represent interactions between source entity 220*m* and 220*q*. Each feature f11, f12, f13, f21, f22, f23 is specified as an expression. For example, features may represent a rate of interactions between two users, how recently two users have interacted with each other, the rate or amount of information retrieved by one user about an entity, or the number and types of comments posted by a user about an entity. The features may also represent information describing a particular entity, for example a user. As an example, a feature may represent the level of interest that a user has in a particular topic, the rate at which the user logs into the online system, or information describing demographic information about a user.

In general, the various features of the online system 100 can be represented as a feature graph. Each feature can be associated with a source entity, a target entity, and a feature value. Dynamic expressions can be used to represent computations based on features. In an embodiment, a feature can be specified as a dynamic expression based on values describing the source entity, the target entity, or interactions between the source and target entities (in the description herein, dynamic expressions are also called expressions, or feature expressions.) Dynamic expressions can be composed, i.e., a dynamic expression can be a function of other dynamic expressions. An online system can have a large number of users, for example, millions or even hundreds of millions of users. There can be a very large number of interactions of users with the online system, interactions between the users, and large amount of information describing the users. Therefore a feature graph represented by the online system 100 can get updated constantly based on information that is received on an ongoing basis.

Figure 2B:
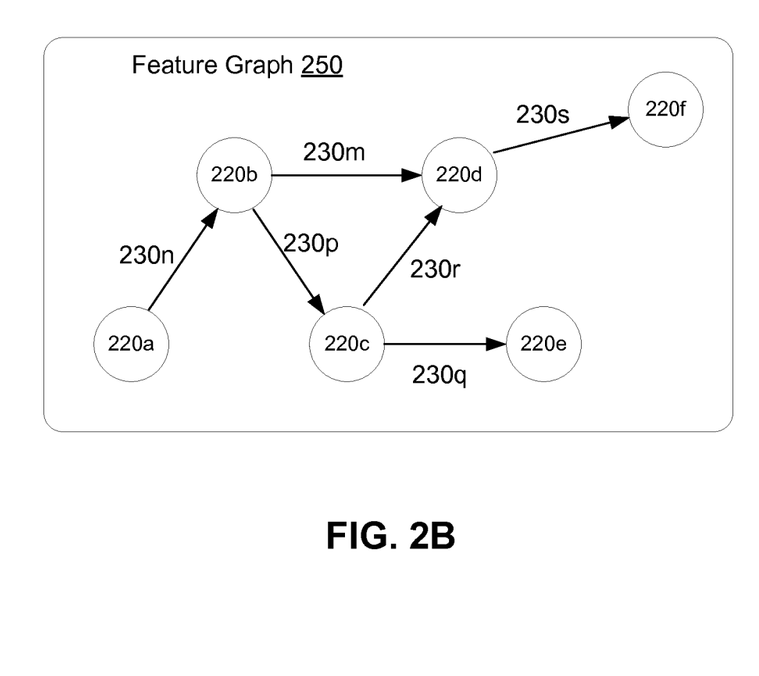
FIG. 2B is a diagram illustrating a feature graph representation of a social network, in accordance with an embodiment of the invention.
Figure 3:
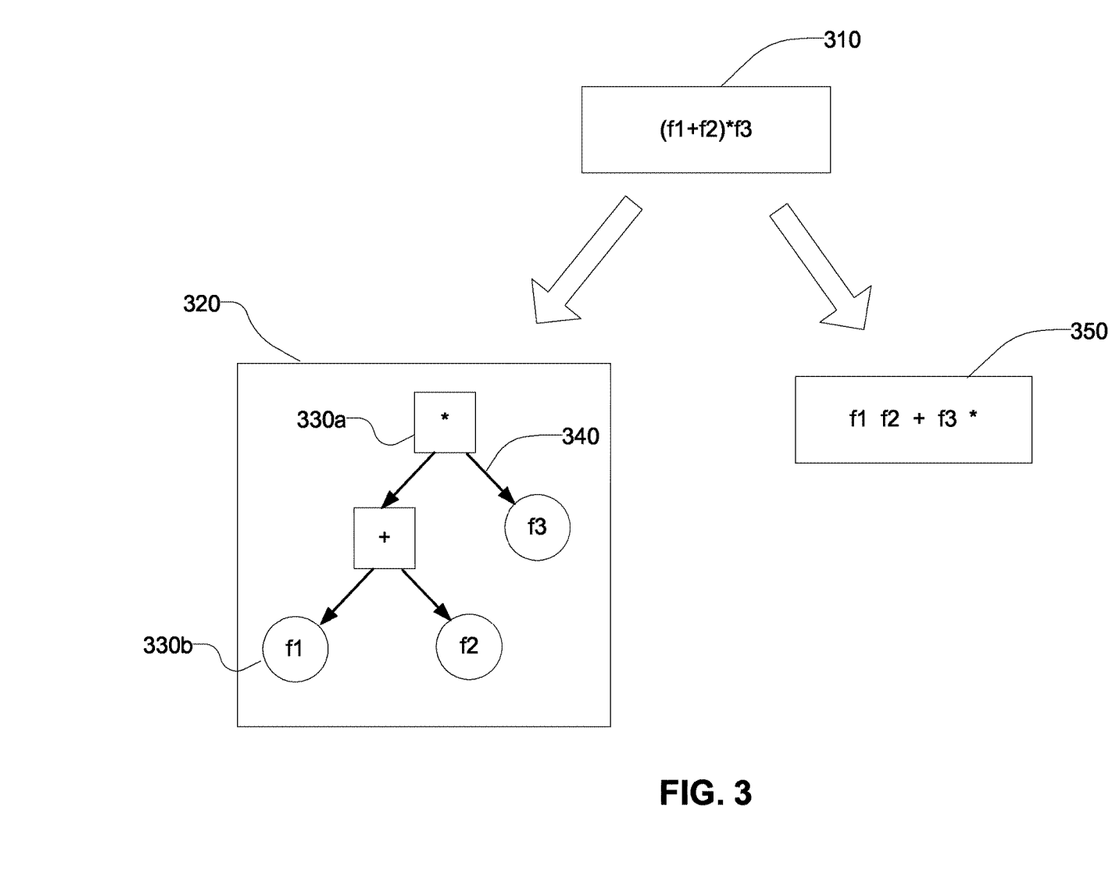
FIG. 3 illustrates various representations of expressions that may be maintained by the expression manager, in accordance with an embodiment of the invention.

FIG. 2B is a diagram illustrating a feature graph representation of a social network, in accordance with an embodiment of the invention. The various nodes 220 correspond to entities represented in the online system 100 and an edge 230 from a source entity to a target entity corresponds to features associated with the source entity and the target entity. Cumulative feature graph 320*a* includes entities 220*a*, 220*b*, 220*c*, 220*d*, 220*e*, and 220*f* and edges 230*m*, 230*n*, 230*p*, 230*q*, 230*r*, and 230*s*. The feature graph may be constantly modified in a social networking system. For example, new entities may be introduced, new edges defined between entities, existing edges modified based on user interactions. The FIG. 3 shows an example with a few nodes and edges in the feature graph. However in an online system with a large number of users, the feature graph may have a large number of nodes and edges. The feature graph is available for other modules of the online system 100 to request feature values.

The feature manager 150 invokes the expression manager 160 for evaluating the expressions corresponding to the features. The expression manager 160 maintains a representation for each expression that the expression manager determines to be the most efficient for execution of the expression. Different representations of an expression include a postfix representation 350 and a tree representation 320. Other representations are possible, for example, a prefix representation.

FIG. 3 illustrates various representations of expressions that may be maintained by the expression manager, in accordance with an embodiment of the invention. FIG. 3 shows an example expression 310 corresponding to the computation (f1+f2)*f3 where each of f1, f2, and f3 may be an attribute value corresponding to a user, an attribute value describing user interactions, or a feature value. The expression 310 can be converted into different possible representations. The representation 320 is a tree representation of an expression. The example, tree representation 320 includes operator nodes 330*a* and value nodes 330*b*. The tree representation 320 includes edges 340 to represent relations between the operator nodes 330*a* and value nodes 330*b*. Other types of tree representations of an expression are possible, for example, a parse tree representation. An expression represented as a tree may be evaluated by traversing the tree and evaluating the value at each operator node by combining the values of sub-trees combined by the operator.

The expression 310 can also be represented using a postfix representation 350. The postfix representation places the operands of an expression before the operator. For example, expression "a+b" can be represented using postfix notation as "a b+." Accordingly, the expression "(f1+f2)*f3" shown in FIG. 3 has a postfix representation 350 corresponding to "f1 f2+f3*". The postfix representation may be stored in memory and each token processed as it is encountered. A stack structure may be used to process the postfix representation 350 of the expression. For example, if the next token encountered while reading the postfix representation 350 of the expression is an operand, the operand is pushed on the stack. If the next token encountered while reading the postfix representation 350 of the expression is an operator, the required number of operands for the operator are popped from the stack and the operator evaluated. The result is pushed on the stack. This processing continues until the entire expression is evaluated. The final value that remains on the stack corresponds to the result of the expression that can be popped and returned to a requester that requested evaluation of the expression.

The expression manager 160 determines which type of representation of an expression is used. The expression manager 160 selects a representation of each expression that the expression manager 160 determines to be most efficient for executing the expression. The expression manager 160 prefers a postfix representation over a tree representation in general. For certain types of expressions, the expression manager 160 may not have the appropriate process to build the postfix representation. For these expressions, the expression manager 160 uses the tree representation or any other representation possible.

System Architecture

FIG. 4A is a diagram of system architecture of an embodiment a social networking system 200 as an example of an online system 100. Although the social networking system 200 is described herein as an example online system, the principles described herein are applicable to other online systems. The social networking system 200 includes a newsfeed generator 435, web server 415, an action logger 440, an action log 245, a connection store 430, user profile store 425, and suggestion module 140, and a feature manager 150. In other embodiments, the social networking system 200 may include additional, fewer, or different modules for various applications. Conventional components such as network interfaces, security mechanisms, load balancers, failover servers, management and network operations consoles, and the like are not shown so as to not obscure the details of the system.

The social networking system 200 stores user profiles in the user profile store 425. The user profile store 425 stores information describing the users of the social networking system 200, including biographic, demographic, and other types of descriptive information, such as work experience, educational history, gender, sexual preferences, hobbies or preferences, location, and the like. The user profile store 425 may also store content provided by the user, for example, images, videos, comments, and status updates. In an embodiment, a user of the social networking system 200 can be an organization, for example, a business, a non-profit organization, a manufacturer, a provider, and the like. The type of information stored in a user profile of an organization may be different from the information stored in a user profile of an individual. For example, an organization may store information describing the type of business, financial information associated with the organization, structure of the organization and so on. A user can be any type of entity that can be represented in the social networking system 200.

The social networking system 200 allows users to add connections to a number of other users of the social networking system 200 to whom they desire to be connected. Connections may be added explicitly by a user, for example, the user selecting a particular other user to be a friend, or automatically created by the social networking system based on common characteristics of the user (e.g., users who are alumni of the same educational institution). Social networking systems may store information describing connections of a user along with the information specific to the user.

The social networking system 200 stores data describing one or more connections between different members in the connection store 430. The connection information may indicate members who have similar or common work experience, group memberships, hobbies, or educational history. Additionally, the social networking system 200 includes user-defined connections between different users, allowing users to specify their relationships with other users. For example, these user-defined connections allow members to generate relationships with other users that parallel the users' real-life relationships, such as friends, co-workers, partners, and so forth. Users may select from predefined types of connections, or define their own connection types as needed. User information describing each user may include information describing connections of the user. Furthermore, information describing a connection of a user may be accessed in relation to actions performed by a user. For example, if the user posts comments on the social networking system, the social networking system 200 may provide information describing the action to connections of the user. The information may be provided to connections of the user via newsfeed.

The social networking system 200 may associate actions taken by users with the user's profile, through information maintained in a database or other data repository. Such actions may include, for example, sending a message to other users, reading a message from the other user, viewing content associated with the other user, among others. In addition, a number of actions performed in connection with other objects are directed at particular users, so these actions are associated with those users as well.

The action logger 440 is capable of receiving communications from the web server 415 about user actions on and/or off the social networking system 200. The action logger 440 populates the action log 445 with information about user actions to track them. Any action that a particular user takes with respect to another user is associated with each user's profile, through information maintained in a database or other data repository, such as the action log 445. Such actions may include, for example, adding a connection to the other user, sending a message to the other user, reading a message from the other user, viewing content associated with the other user, attending an event posted by another user, among others.

A social networking system 200 maintains a newsfeed channel that provides regular updates of information available in the social networking system 200 to a user. The information reported via the newsfeed channel is determined by the newsfeed generator 435. The newsfeed generator 435 generates messages for each user about information that may be relevant to the user, based on actions stored in the action log 445. These messages are called "stories"; each story is an message comprising one or a few lines of information based on one more actions in the action log that are relevant to the particular member. For example, if a connection of a user performs a transaction, the action may be reported to the user via a newsfeed story. The actions reported via the newsfeed are typically actions performed by connections of the user but are not limited to those. For example, if certain information unrelated to the connections of the user is determined to be useful to the user, the information can be reported to the user via a newsfeed.

The web server 415 links the social networking system 200 via the network 410 to one or more client devices 110; the web server 415 serves web pages, as well as other web-related content, such as Flash, XML, and so forth. The web server 415 provides the functionality of receiving and routing messages between the social networking system 200 and the client devices 110. These messages can be instant messages, queued messages (e.g., email), text and SMS (short message service) messages, or any other suitable messaging technique. In some embodiments, a message sent by a user to another can be viewed by other users of the social networking system 200, for example, by the connections of the user receiving the message. An example of a type of message that can be viewed by other users of the social networking system 200 besides the recipient of the message is a wall post.

The social networking system 200 may provide users with the ability to take actions on various types of entities supported by the website. These entities may include groups or networks (where "networks" here refer not to physical communication networks, but rather to social networks of people) to which members of the website may belong, events or calendar entries in which a member might be interested, computer-based applications that a member may use via the website, and transactions that allow members to buy, sell, auction, rent, or exchange items via the website. A user profile may store associations of a user with various entities.

The social networking system 200 may provide various mechanisms to users to communicate with each other or to obtain information that they find interesting, for example, activities that their friends are involved with, applications that their friends are installing, comments made by friends on activities of other friends etc. The mechanisms of communication between members are called channels. If a user communicates with another user, the user information of both users may have to be accessed, for example, to associate the action of communicating with the sender and the receiver.

The feature manager 150 extracts feature values from the signals 105 received by the social networking system 200 corresponding to user actions. The feature manager 150 stores the feature values extracted and provides feature values to various modules of the social networking system 200. The feature manager 150 invokes the expression manager 160 to evaluate various expressions. The expression manager 160 is described in the description of FIG. 1 and is described in further detail herein, for example, in FIG. 4B.

The feature manager 150 extracts feature values based on the user actions performed by users of the social networking system 200. The feature manager 150 extracts features based on metadata describing the feature. In an embodiment, the metadata describing various features is stored in memory of the processors implementing the social networking system 200 for faster access. Each feature type may be associated with certain types of user actions. For example, a feature corresponding to a rate of communication between a source user and a target user may be associated with every communication between the source and the target user. In an embodiment, multiple instances of an action of a particular type that occur within a short time interval are treated as a single instance of the user action. When a user action of a particular type is performed by a user, all features associated with the user action may be reevaluated. An aggregate rate of communication between the two users may be obtained by combining the different count values based on an expression describing the feature. As another example, if a feature is based on the number of times a user viewed a photo, each instance of the user viewing the photo may cause the feature to be re-evaluated.

In an embodiment, a features table stores the values of various features. For example, the features table may have columns source ID, target ID, type of target, action ID, and various features. In an embodiment, the values for various features may be represented as name value pairs associated with each instance of source and target. In another embodiment, the data generated for a particular predictor model is represented as table I in which each source and target is associated with various features that are relevant to the model.

TABLE I

| Row ID | Source ID | Target ID | Feature F1 | Feature F2 |
|--------|-----------|-----------|------------|------------|
| 2001 | 100 | 200 | 20 | 512 |
| 2002 | 100 | 201 | 20 | 630 |
| 2003 | 101 | 202 | 15 | 720 |

The suggestion module 140 identifies information of interest to various users and sends the information to them. For example, the social networking system may send to a user, stories describing actions taken by other users that are connected to the user. The story may be communicated to the user via a channel of communication of the social networking system, for example, a newsfeed channel. The suggestion module 140 uses information available in the user profiles of various users to determine stories of interest to each user. The suggestion module 140 may use information available in a feature store 130 to determine the information that is presented to a user, for example, the suggestion module 140 may invoke a dynamic expression based on feature vectors to rank a set of entities. In some embodiments, a suggestion module 140 may use predictor models, for example, machine learning models for selecting information presented to a user. These predictor models are trained using data obtained from feature store 130. Various other modules may use information stored in a feature store 130 for making decisions. For example, a module may use information stored in the feature store 130 to select potential friends for a user for suggesting to the user. The newsfeed generator 435 may evaluate dynamic expressions based on features to select newsfeed items for presenting to the user. Dynamic expressions may be used for various other purposes in an online system, for example, a social networking system may rank various entities for a user, for example, rank friends of a user, potential friends for the user, pages likely to be of interest to the user, content likely to be of interest to the user, search terms for type ahead for a given user, advertisements likely to be of interest to a user and the like.

The client device 110 executes a browser 405 to allow the user to interact with the social networking system 200. The browser 405 allows the user to perform various actions using the social networking system 200. These actions include retrieving information of interest to the user, recommending content to other users, upload content to the social networking system 200, interact with other users of the social networking system, establish a connection with a user of the social networking system, and the like.

The interactions between the client devices 110 and the online system 100 are typically performed via a network 410, for example, via the internet. The network 410 enables communications between the client device 110 and the social networking system 200. In one embodiment, the network 410 uses standard communications technologies and/or protocols. Thus, the network 410 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 410 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 410 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above. Depending upon the embodiment, the network 410 can also include links to other networks such as the Internet.

Figure 4B:
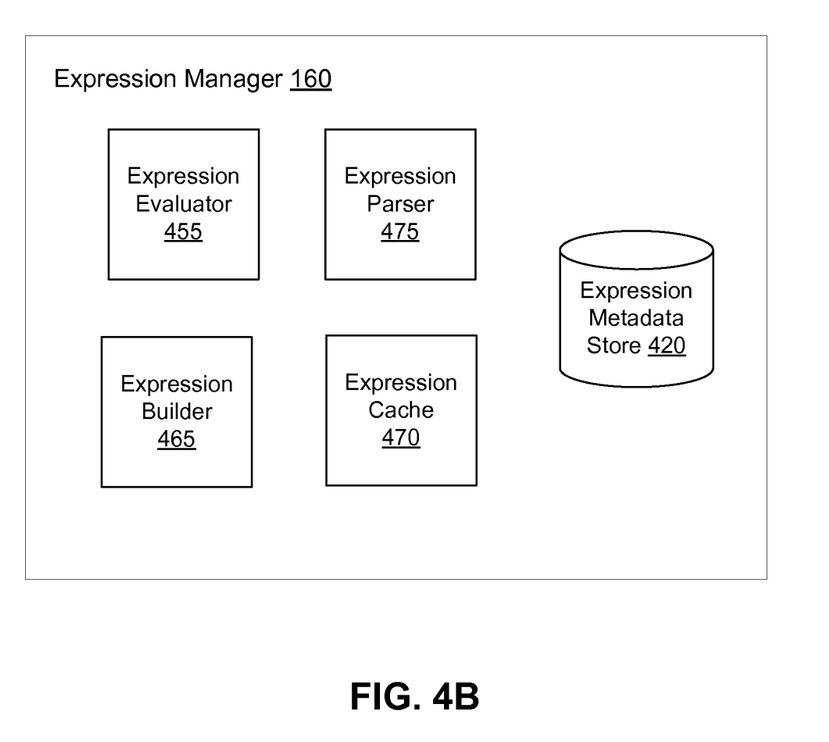
FIG. 4B illustrates sub-modules of an expression manager module that allows management of features in an online system, in accordance with an embodiment of the invention.

FIG. 4B illustrates sub-modules of an expression manager module that allows management of features in an online system, in accordance with an embodiment of the invention. The expression manager 160 comprises modules including an expression evaluator 455, an expression parser 475, expression metadata store 420, an expression builder 465, and an expression cache 470. The expression manager allows dynamic execution of expressions that are specified at call time or runtime. Accordingly, the expression manager receives specifications of expressions at runtime, and incorporates them in the online system to allow execution of the expressions without having to upgrade or reinstall the code of the online system.

The metadata describing various types of expressions is stored in the expression metadata store 420. An expression may correspond to a feature and may be based on values associated with entities represented in the social networking system 200 and actions performed in the social networking system 200. These expressions representing features can be provided by experts and added to the system by a privileged user, for example, a system administrator. In an embodiment, a feature is represented as an expression based on actions logged in the social networking system, i.e., feature=expression(logged_actions). A expression may be based on other features or actions, or combinations of the two. As an example of a feature as an expression, if the target is a user, and view_profile corresponds to the source user viewing the target user's profile, view_photo corresponds to the source user viewing the target users photo, and view_comment corresponds to the source user viewing a comment posted by the target user, a feature called observation may be defined as follows.

$$observation = view\_profile + view\_photo + 0.5 \times view\_comment$$

In the above equation, a value of a term, say view_profile is 1 if the action occurs and 0 if the action doesn't occur. In another embodiment, the value of each term may be a score value based on information describing the particular action, for example, the number of times the action is performed by the user within a time interval, or a score based on the length of time associated with the action such as a length of time that a user observes a photo before retrieving a different photo.

In an embodiment, a feature expression may determine an aggregate value based on actions performed by the source user with respect to multiple targets. For example, a feature expression may represent an aggregate of all page views performed by a source user in a given time interval for all other users connected to the source user. Another feature expression may represent the rate at which a user views images posted by other users connected to the user. A feature expression may represent an action performed by a source user with respect to a target user that is normalized based on the source user's behavior with respect to all other users connected to the source user. For example, a feature expression may represent how often a source user interacts with a target user normalized using the average number of interactions of the source user with other users connected to the source user. The feature metadata may specify an expression for combining partial results associated with a feature value. For example, an expression describing a feature may specify how to obtain the feature value by combining partial results of evaluating a feature for two different time intervals.

In some embodiments, the language supported by the expression manager 160 for allowing specification of expressions allows variables or any other identifier to be used to represent a set of computations. For example, a set of computations such as an expression may be referred to by a variable name, a number, a hash value determined using the specification of the expression, or any other identifier. For example, an expression E1 may be referred to by a variable x1 by specifying "x1:=E1" using the language, or an expression E2 may be referred to by a variable x2 by specifying "x2:=E2".

As an example, a computation F(E1, E2, E1, E2) may be simplified and expressed as F(x1, x2, x1, x2). In the simplified representation of the expression, the computations of the expressions E1 and E2 are not repeated and the result of computation gets reused. As a result the simplified representation can be executed more efficiently compared to the original representation of F. The expression F can itself be nested in other expressions leading to a complex nested expression. As a result, expressions having variables that represent other expressions may be difficult to convert to a postfix representation.

The expression parser 475 parses an expression stored in the expression metadata store 420 to make sure the syntax of the expression is correct, i.e., the syntax of the expression conforms to the language used for specifying the expression. The expression parser 475 also collects information describing the expression, for example, whether the expression uses variables representing other expressions. The expression parser 475 builds certain data structure storing all information describing the expression, for example, a parse tree or any other representation of the expression.

The expression builder 465 uses the information describing an expression provided by the expression parser 475 to build a representation of the expression and stores the representation in the expression cache 470. In an embodiment, the expression cache 470 comprises a portion of a fast access storage, for example, random access memory (RAM) that is allocated for storing representations of expressions. The expression cache 470 may store the various structures corresponding to the expressions as a lookup table that maps an identifier for the expression to the structure representing the expression.

The expression builder 465 selects a type of representation for the expression from a plurality of types of representation including a tree representation and a postfix representation. The expression builder 465 performs the selection of the representation for an expression based on an efficiency of evaluation of the expression using the type of representation. In general expression builder 465 prefers a postfix representation for an expression as being efficient compared to other representations, for example, the tree representation.

However, if the expression uses variables that represent other expressions, the expression builder 465 builds a tree representation for the expression since postfix representation of such expressions is difficult to build and maintain. In an embodiment, the expression builder 465 analyzes the information describing the expression provided by the expression parser 475 to determine whether the expression has any variables representing other expressions. If the expression lacks variables representing other expressions the expression builder 465 builds a postfix representation of the expression.

The expression evaluator 455 receives requests to evaluate an expression and evaluates the expression as requested. The expression evaluator 455 may receive a request to evaluate an expression for a set of entities represented in the online system. Storing the representations of the expressions in a fast access expression cache 470 allows the request evaluation to be performed efficiently. In a social networking system, the expression evaluator 455 often receives requests to evaluate expressions for a set of entities, for example, a set of connections of a user, a set of news feed items, or a set of advertisements for ranking these entities for presentation to a user. As a result, the use of the expression cache and the use of the most efficient representation of each expression provides significant performance improvement. If the expression evaluator 455 determines that an expression is represented using a postfix represented, the expression evaluator 455 uses a stack to evaluate the expression as described in the description of FIG. 3.

The expression manager 160 allows dynamic modifications to the structures of expressions stored in the expression cache 470. For example, if a new expression is received by the expression manager 160, the representation of the new expression is determined by the expression builder 465 and the representation added to the expression cache 470. The expression manager 160 also allows expressions existing in the expression cache 470 to be modified. For example, a new expression may replace an existing expression. In this situation, the expression builder 465 generates a new representation for the expression and replaces the existing representation of the expression in the expression cache 470 with the new representation. The expression manager 160 may lock certain portions of the expression cache 470 while performing modifications to the expression cache 470.

If an expression existing in the expression cache is modified, the expression builder may replace a type of representation of the expression with a new type of representation. For example, if an expression that does not use variables to represent other expressions is modified to include such variables, the existing representation of the expression in the expression cache 470 may be changed from a postfix representation to a tree representation. Similarly, if an expression that uses variables to represent other expressions is modified such that it does not include any such variables, the existing representation of the expression in the expression cache 470 may be changed from a tree representation to a postfix representation.

Overall Process of Storing Feature Values

Figure 5:
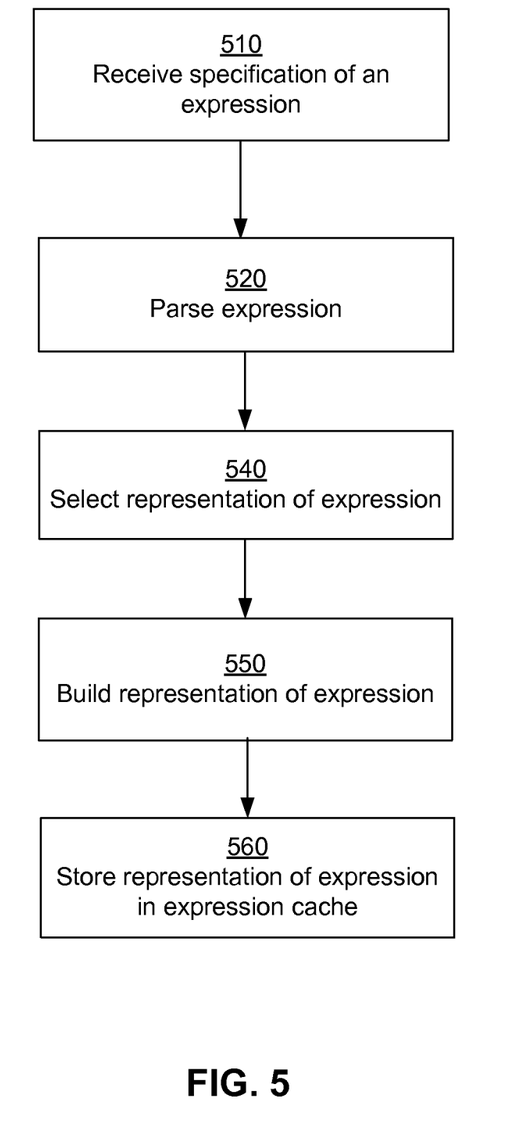
FIG. 5 illustrates the overall process of building the representations of expressions in the expression cache, in accordance with an embodiment of the invention.

FIG. 5 illustrates the overall process of building the representations of expressions in the expression cache, in accordance with an embodiment of the invention. The expression manager 160 receives 510 the specification of an expression. The specification of the expression may be provided by the feature manager 150 based on feature metadata received by the feature manager. In an embodiment, the feature manager 150 may identify an expression stored in the expression metadata store 420 thereby allowing the expression parser 475 to retrieve the specification of the expression from the expression metadata store 420.

The expression parser 475 parses 520 the expression to validate the expression. Furthermore, the expression parser 475 analyzes the expression as the expression is parsed and builds data structures describing the expression. The expression builder 465 uses the information assimilated by the expression parser 475 to select 540 a representation for the expression, for example, a postfix representation or a tree representation. The expression builder 465 builds 550 the selected representation of the parser and stores 560 the representation in the expression cache 470.

The above process is repeated for each expression that is received. In an embodiment, the process described in FIG. 5 may be performed when the expression cache has previously been populated to add a new expression. In another embodiment, the store 560 operation may replace an existing representation of the expression, for example, if the expression is dynamically modified while the online system is running and in use.

Figure 6:
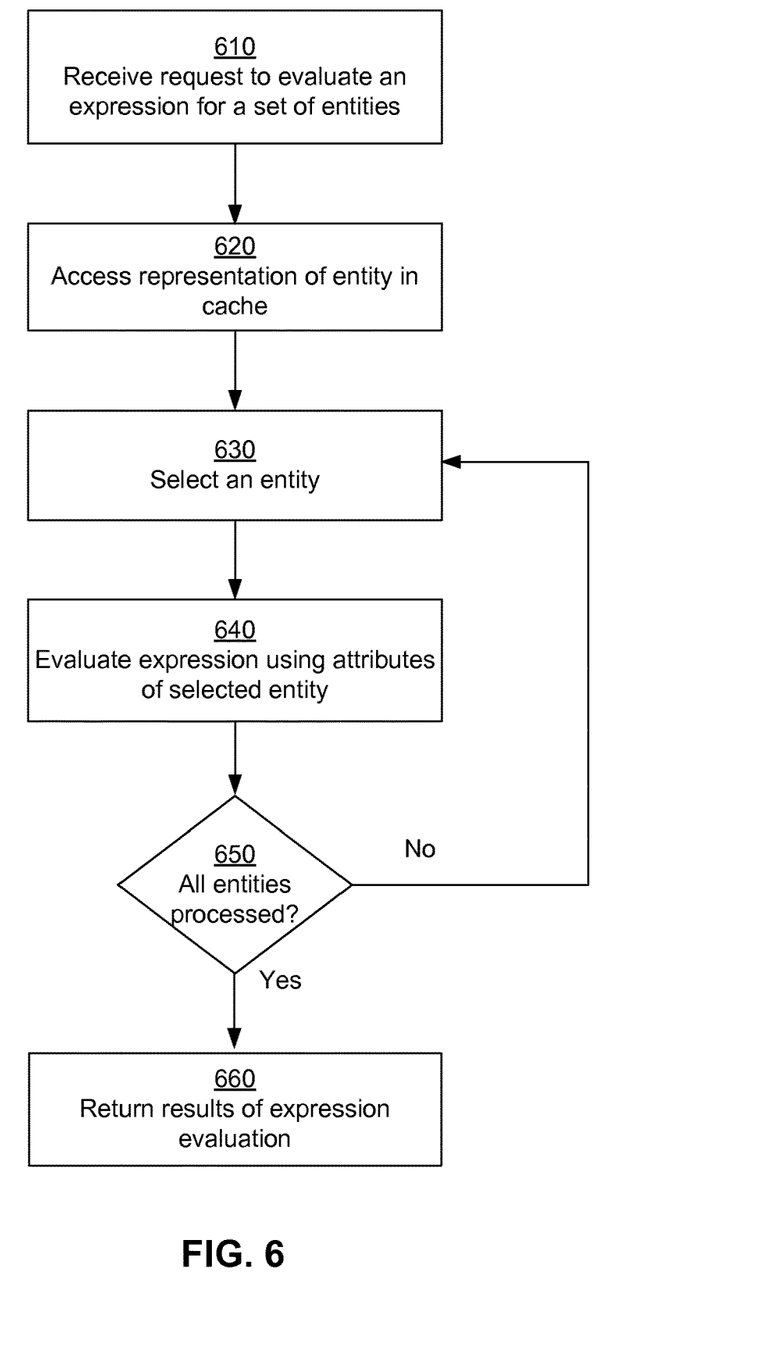
FIG. 6 illustrates the overall process of processing an expression for of feature set, for example, user accounts or entities represented in the online system, in accordance with an embodiment of the invention.

FIG. 6 illustrates the overall process of processing an expression for of feature set, for example, user accounts or entities represented in the online system, in accordance with an embodiment of the invention. The process described in FIG. 6 may be performed after a set of expressions are populated in the expression cache, for example, using the process illustrated in FIG. 5. The expression evaluator 455 receives 610 a request to evaluate a given expression for a given set of entities, for example, to evaluate an expression for a set of connections of a user. The expression evaluator 455 accesses 620 the representation of the expression in the expression cache 470. The expression evaluator 455 selects 630 an entity from the set of entities and evaluates 640 the expression using attributes of the entity selected.

The expression evaluator 455 checks 650 whether all entities from the set have been processed. If there are entities remaining to be processed, the expression evaluator 455 repeats the steps 630, 640, and 650. If all entities have been processed, the expression evaluator 455 returns the results of evaluation of the expression. In an embodiment, the expression evaluator 455 returns the results of evaluation of the expression as soon as they are available, for example, as soon as step 640 is performed for each entity.

Alternative Applications

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter. For example, the method for executing dynamic expressions can be used in other types of online systems and is not limited to social networking systems.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
receiving, by a social networking system, information describing a plurality of expressions, each expression specifying a set of computations using an expression language, each expression comprising operands and one or more operators for combining the operands into a result, the operands comprising attributes of entities represented in the social networking system;
for each expression of the plurality of expressions:
determining whether the expression includes a variable term referring to a different expression using the expression language;
selecting a type of representation for the expression by selecting between a tree representation and a postfix representation based at least in part on whether the expression includes a variable term referring to a different expression,
generating a data structure representing the expression by converting the expression from the expression language to the selected type of representation, and
storing the generated data structure in a cache;
receiving a request to evaluate an expression for a set of entities represented in the social networking system, the request associated with a viewing user;
accessing, from a feature store of the social networking system, values of operands included in the requested expression for the set of entities;
accessing the data structure representing the requested expression from the cache;
determining, by a processor, an expression result for each entity of the set of entities by evaluating the requested expression using the data structure representing the expression accessed from the cache and using the values of the operands of the requested expression accessed from the feature store;
selecting one or more of the entities based on a ranking of the set of entities according to the expression result for each entity; and
providing the selected one or more entities for presentation to the viewing user.

2. The computer-implemented method of claim 1,
wherein selecting the type of representation for the expression comprises selecting the postfix representation over the tree representation responsive to determining that the expression does not include any variable term, and
wherein generating the data structure representing the expression comprises generating a stack structure to represent the postfix representation.

3. The computer-implemented method of claim 1, wherein the selected type of representation is the postfix representation, wherein determining the expression result for an entity comprises:

sequentially reading the one or more operators and the operands from the postfix representation of the expression;
responsive to reading an operand, pushing the operand onto a stack data structure; and
responsive to reading an operator,
popping a number of operands from the stack data structure, the number of operands corresponding to the operator,
determining a result of the operator by combining the number of operands popped from the stack according to the operator, and
pushing the result of the operator to the stack data structure.

4. The computer-implemented method of claim 1,
wherein selecting the type of representation for the expression comprises:
selecting the tree representation responsive to determining that the expression includes the variable term.

5. The computer-implemented method of claim 1,
wherein selecting the type of representation for the expression comprises:
selecting the postfix representation responsive to determining that the expression does not include any variable term.

6. The computer-implemented method of claim 1, further comprising:
receiving a modified expression corresponding to an expression stored in the cache; and
modifying the representation of the expression in the cache based on the modified expression.

7. The computer-implemented method of claim 1, further comprising:
receiving a modified expression corresponding to an expression stored using the postfix representation in the cache, the modified expression including at least one variable term representing at least one different expression; and
changing the representation of the expression in the cache to the tree representation.

8. The computer-implemented method of claim 1, further comprising:
receiving a modified expression corresponding to an expression stored using the tree representation in the cache, the modified expression lacking variable terms representing different expressions; and
changing the representation of the expression in the cache to the postfix representation.

9. The computer-implemented method of claim 1, wherein the set of entities corresponds to a set of connections of a user, wherein selecting the one or more of the entities comprises:
ranking the connections from the set of connections using results of evaluation of the expression.

10. The computer-implemented method of claim 1, wherein the set of entities corresponds to a set of content items for presentation to a user, wherein selecting the one or more entities comprises:
ranking the content items from the set of content items using results of evaluation of the expression; and
selecting one or more content items for presentation to the user based on the ranks of the content items.

11. A computer program product having a non-transitory computer-readable storage medium storing computer-executable code executable to cause a processor to:

receive information describing a plurality of expressions, each expression specifying a set of computations using an expression language, each expression comprising operands and one or more operators for combining the operands into a result, the operands comprising attributes of entities represented in the social networking system;

for each expression of the plurality of expressions:
determine whether the expression includes a variable term referring to a different expression using the expression language;
select a type of representation for the expression by selecting between a tree representation and a postfix representation based at least in part on whether the expression includes a variable term representing a different expression,
generate a data structure representing the expression by converting the expression from the expression language to the selected type of representation, and
store the generated data structure in a cache;

access, from a feature store of the social networking system, values of operands included in the requested expression for the set of entities;
access the data structure representing the requested expression from the cache;
receive a request to evaluate an expression for a set of entities represented in the social networking system; and
determine an expression result for each entity of the set of entities by evaluating the requested expression using the data structure representing the expression accessed from the cache and using the values of the operands of the requested expression accessed from the feature store.

12. The computer program product of claim 11,
wherein selecting the type of representation for the expression comprises selecting the postfix representation over the tree representation responsive to determining that the expression does not include any variable term, and
wherein generating the data structure representing the expression comprises generating a stack structure to represent the postfix representation.

13. The computer program product of claim 11,
wherein selecting the type of representation for the expression comprises:
selecting the tree presentation responsive to determining that the expression includes the variable term.

14. The computer program product of claim 11, wherein selecting the type of representation for the expression comprises:
selecting the postfix representation responsive to determining that the expression does not include any variable term.

15. The computer program product of claim 11, wherein the code further comprises code executable to cause the processor to:
receive a modified expression corresponding to an expression stored in the cache; and
modify the representation of the expression in the cache based on the modified expression.

16. The computer program product of claim 11, wherein the set of entities corresponds to a set of connections of a user, wherein the code further comprises code executable to cause the processor to:
rank the connections from the set of connections using results of evaluation of the expression.

17. The computer program product of claim 11,
wherein the set of entities corresponds to a set of advertisements for presentation to a user,
wherein the code further comprises code executable to cause the processor to:
rank the advertisements from the set of advertisements using results of evaluation of the expression; and
select one or more advertisements for presentation to the user based on the ranks of the advertisements.

18. The computer program product of claim 11,
wherein the set of entities corresponds to a set of content for presentation to a user,
wherein the code further comprises code executable to cause the processor to:
rank the content items from the set of content items using results of evaluation of the expression; and
select one or more content items for presentation to the user based on the ranks of the content items.

19. A computer-implemented method comprising:
receiving, by a social networking system, information describing an expression specifying a set of computations using an expression language, each expression comprising operands and one or more operators for combining the operands into a result, the operands comprising attributes of entities represented in the social networking system;
determining whether the expression includes a variable term referring to a different expression using the expression language;
selecting a type of representation for the expression by selecting between a tree representation and a postfix representation based at least in part on whether the expression includes a variable term representing a different expression;
generating a data structure representing the expression by converting the expression from the expression language to the selected type of representation;
storing the generated data structure in a cache;
receiving a request to evaluate the expression for an entity represented in the social networking system;
accessing, from a feature store of the social networking system, values of operands included in the requested expression for the entity;
accessing the data structure representing the expression in the cache;
determining, by a processor, an expression result for the entity by evaluating the requested expression using the data structure representing the expression accessed from the cache and using the determined values of the operands for the entity; and
determining a ranking of the entity among a plurality of entities based on the expression result.

20. The computer-implemented method of claim 19,
wherein selecting the type of representation for the expression comprises selecting the postfix representation over the tree representation responsive to determining that the expression does not include any variable term, and
wherein generating the data structure representing the expression comprises generating a stack structure to represent the postfix representation.

21. The computer-implemented method of claim 1,
wherein selecting the type of representation for the expression comprises selecting the tree representation over the postfix representation responsive to determining that the expression includes at least one variable term, and wherein generating the data structure representing the expression comprises generating operator nodes representing the operators of the expression, value nodes representing operands of the expression, and edges between the operator nodes and the value nodes.

22. The computer-implemented method of claim 1, wherein the one or more entities comprise at least one of: one or more connections to suggest to the viewing user, one or more close friends from a viewing user's set of friends to present to the viewing user, one or more advertisements to present to the viewing user, one or more newsfeed items to present to the viewing user, one or more content items to present to the viewing user, one or more search terms to suggest to the viewing user, or one or more pages to suggest to the viewing user.

* * * * *

UNITED STATES PATENT AND TRADEMARK OFFICE
CERTIFICATE OF CORRECTION

PATENT NO. : 10,395,321 B2
APPLICATION NO. : 13/690088
DATED : August 27, 2019
INVENTOR(S) : Alon Michael Shalita, Ming Hua and Ryan Allen Stout It is certified that error appears in the above-identified patent and that said Letters Patent is hereby corrected as shown below:

In the Claims

Column 16, Claim 10, Lines 59-60, delete "wherein selecting the one or more entities comprises:" and insert -- wherein selecting the one or more of the entities comprises: --

Column 17, Claim 13, Line 47, delete "selecting the tree presentation responsive to" and insert -- selecting the tree representation responsive to --

Column 18, Claim 18, Lines 11-12, delete "entities corresponds to a set of content for presentation" and insert -- entities corresponds to a set of content items for presentation --

Signed and Sealed this
Seventeenth Day of March, 2020

Andrei Iancu
*Director of the United States Patent and Trademark Office*